United States Patent [19]

Krijnen et al.

[11] Patent Number: 4,803,264
[45] Date of Patent: Feb. 7, 1989

[54] PROCESS FOR THE PREPARATION OF A POLYSACCHARIDE IN OIL DISPERSION AND DISPERSION OBTAINED THEREBY

[75] Inventors: Wilhelmus J. Krijnen; Jacob B. Roest; Jacob Bloemheuvel, all of Amsterdam, Netherlands

[73] Assignee: Shell Oil Company, Houston, Tex.

[21] Appl. No.: 934,981

[22] Filed: Nov. 25, 1986

[30] Foreign Application Priority Data

Dec. 9, 1985 [GB] United Kingdom ................. 8530271

[51] Int. Cl.$^4$ ........................... C09K 7/06; C08J 3/02; E21B 43/25
[52] U.S. Cl. ...................... 536/114; 536/87; 536/96; 536/98; 536/124; 106/170; 106/191; 106/208
[58] Field of Search .......................... 252/8.515, 8.551; 106/170, 191, 208; 536/114, 87, 96, 98, 124

[56] References Cited

U.S. PATENT DOCUMENTS

| | | | |
|---|---|---|---|
| 4,312,675 | 1/1982 | Pickens et al. | 106/208 |
| 4,525,515 | 6/1985 | Peignier et al. | 106/270 |
| 4,571,422 | 2/1986 | Symes et al. | 536/114 |
| 4,670,167 | 6/1987 | Bleeker et al. | 106/208 |
| 4,670,550 | 6/1987 | Bleeker et al. | 106/208 |

FOREIGN PATENT DOCUMENTS 128661 12/1984 European Pat. Off. .
137538 4/1985 European Pat. Off. .

*Primary Examiner*—Ronald W. Griffin

[57] ABSTRACT

The invention provides a process for the preparation of a polysaccharide in oil dispersion which comprises the steps of
(a) forming a water-in-oil emulsion by dispersing in oil an aqueous solution of polysaccharide, in the presence of at least one dispersion promoter,
(b) drying the resulting emulsion azeotropically, and
(c) physically isolating from the resulting azeotropically dried residue an oil phase containing oil and dispersion promoter and a polysaccharide in oil dispersion in the form of a suspension phase containing polysaccharide, dispersion promotor and oil;

and a polysaccharide in oil dispersion prepared by the process containing 40 to 50% w/w polysaccharide and 3 to 4.5% w/w of at least one dispersion promoter.

9 Claims, No Drawings

PROCESS FOR THE PREPARATION OF A POLYSACCHARIDE IN OIL DISPERSION AND DISPERSION OBTAINED THEREBY

This invention relates to a process for the preparation of a polysaccharide in oil dispersion and to a dispersion obtainable by the process.

EP-A-No. 128 661 discloses a method of making a fluid composition in the form of a dispersion of polysaccharide in oil which comprises dispersing an aqueous polysaccharide solution in oil in the presence of a dispersion promoter selected from surfactant and stabiliser and then drying the resulting emulsion. The total amount of surfactant and stabiliser (if present) is stated to be generally in the range 10 to 50%, preferably 15 to 40%, by weight of the polysaccharide, the amount of surfactant and the amount of the stabiliser in the final dispersion being said individually to be generally from 2 to 20%, often 5 to 15%, by weight of the dispersion. The polysaccharide is preferably selected from xanthan biopolymers and other microbial polysaccharides. It is further stated that, especially when the polysaccharide is xanthan biopolymer, there is marked increase in stability if at some stage of the emulsification process of the aqueous solution with oil the temperature is at least 50° C., e.g. 50 to 120° C. and preferably 75° to 95° C.

In the examples of EP-A-128 661, for each emulsion formed, drying was by azeotropic distillation, at temperatures from 25 to 85° C., and pressures reduced to 14 mmHg ($1.87 \times 10^3$ Pa), and in every case azeotropic distillation was followed by raising the temperature to 94° or 95° C. to distil off volatile oil.

The only examples for which data is sufficiently complete to enable calculation of amount of dispersion promoter in the final dispersions are Examples 1, 7, 8 and 10. The dispersion of Example 1 contains 56% w/w polysaccharide and 20.5% w/w dispersion promoters (36.7% w on polysaccharide); that of Example 7 contains 44% w/w polysaccharide and 13% w/w dispersion promoters (29.8% w on polysaccharide); that of Example 8 contains 48% w/w polysaccharide and 39.4% dispersion promoters (82% w on polysaccharide); and that of Example 10 contains 58% w/w polysaccharide and 17.8% w/w dispersion promoters (30.7% w on polysaccharide).

EP-A-137 538 refers to biopolymer water-in-oil emulsions comprising 1 to 70% w/w polysaccharide, 10 to 60% w/w hydrophobic liquid, 5 to 60% w/w water and 1 to 25% w/w emusifier. The emulsions preferably comprise 30 to 65% w/w polysaccharide, 15 to 40% w/w hydrophobic liquid, 5 to 25% w/w water, 5 to 25% w/w emulsifier and 1 to 15% w/w stabiliser. The emulsions having higher polysaccharide concentrations are achieved by evaporation under reduced pressure, preferably 1 to 50 mmHg ($1.33 \times 10^2$ Pa to $6.67 \times 10^3$ Pa), and at elevated temperature, preferably 40 to 120° C. Preferably concentration by evaporation is effected to the extent necessary for the resulting emulsions to have biopolymer concentrations in the range 35 to 45% w/w.

In the Examples of EP-A-No. 137 538, concentration by evaporation was achieved either at 60° C. at a pressure decreasing from 30 mmHg ($4 \times 10^3$ Pa) to 3 mmHg ($4 \times 10^2$ Pa) or at a temperature of 80° to 100° C. at a pressure decreasing from 40 mmHg ($5.33 \times 10^3$ Pa) to 10 mmHg ($1.33 \times 10^3$ Pa).

The only examples for which data is sufficiently complete to enable calculation of amounts of dispersion promotor in the final concentrated emulsions are Examples 5, 13 and 14. The emulsion of Example 5 contains 69% w/w polysaccharide and 12.3% w/w dispersion promoters (17.8% w on polysaccharide); the emulsion of Example 13 contains 26% w/w polysaccharide and 4.6% w/w dispersion promoters (17.8% w/w on polysaccharide); and the emulsion of Example 14 contains 55% w/w polysaccharide and 18.3% w/w dispersion promoters (33.3% w on polysaccharide).

In both EP-A-No. 128 661 and EP-A-No. 137 538, a polysacchardie in oil dispersion is prepared by forming a water-in-oil emulsion by dispersing in oil an aqueous solution of polysaccharide, in the presence of at least one dispersion promoter, and concentrating the resulting emulsion exclusively by evaporation to obtain the eventual polysaccharide in oil dispersion.

It will be appreciated that the dispersion promoter needs to be present in an amount sufficient to form the water-in-oil emulsion, and that whole amount of dispersion promoter will remain in the eventual polysaccharide in oil dispersion. Such a high concentration of dispersion promoter is not necessary to enable the polysaccharide in oil dispersion to be diluted in aqueous solution, e.g. for use in enhanced oil recovery operations or in well-drilling operations, e.g. in oil and gas wells, as completion fluids, work-over fluids or drilling fluids.

It has now surprisingly been discovered that if evaporation is stopped when azeotropic distillation ceases, the residue will separate on standing into two phases, i.e. an oil phase consisting predominantly of oil and dispersion promoter and a stable polysaccharide in oil dispersion in the form of a suspension phase containing polysaccharide, dispersion promoter and oil. This suspension phase contains a lower concentration of dispersion promoter than the corresponding prior art dispersions of polysaccharide in oil, and the oil phase, containing dispersion promoter, can be recycled, thereby reducing overall consumption of dispersion promoters. In the absence of the need to distil off oil after azeotropic distillation has ceased, use of high temperatures and/or very low pressures can be avoided, leading to reduced energy requirements.

According to the present invention therefore there is provided a process for the preparation of a polysaccharide in oil dispersion which comprises the steps of
 (a) forming a water-in-oil emulsion by dispersing in oil an aqueous solution of polysaccharide, in the presence of at least one dispersion promoter,
 (b) drying the resulting emulsion azeotropically, and
 (c) physically isolating from the resulting azeotropically dried residue an oil phase containing oil and dispersion promoter and a polysaccharide in oil dispersion in the form of a suspension phase containing polysaccharide, dispersion promoter and oil.

The physical isolation step (c) may be effected simply by allowing the dried residue to settle, conveniently at ambient temperature, and decanting off the oil phase, or the dried residue may be centrifuged and the oil phase decanted off, or the dried residue may be subjected to microfiltration or ultrafiltration, e.g. using a filtration membrane of pore diameter of about 1 micrometre or less, the oil phase being collected as permeate and the suspension phase being obtained as retentate.

Examples of polysaccharides include cellulose derivatives, such as carboxyethylcellulose, carboxymethylcellulose, carboymethylhydroxyethylcellulose, alkylhydroxyalkylcelluloses, alkylcelluloses, alkylcarboxyalkylcelluloses and hydroxyalkylcellulose (particularly hydroxyethylcellulose); and microbial polysaccharides such as succinoglycan biopolymers and xanthan biopolymers.

Succinoglycan biopolymers comprise glucose, and, for each 7 mols of glucose, 0.9 to 1.2 mols of galactose, 0.65 to 1.1 mols pyruvate, 0 to 2 mols succinate and 0 to 2 mols to acetate, and are produced by cultivating a slime-forming species of Pseudomonas, Rhizobium, Alcaligenes or Agrobacterium, e.g. Pseudomonas sp. NCIB 11264, Pseudomonas sp. NCIB 11592 or *Agrobacterium radiobacter* NCIB 11883, or mutants thereof, as described, for example, in EP-A-No. 40 445 or EP-A-No. 138 255.

Xanthan biopolymers typically contain mannose, glucose, glucuronic acid, O-acetyl radicals and acetal-linked pyruvic acid in molar ratio 2:2:1:1:0.5, and are produced by cultivating a species of Xanthomonas bacteria, preferably *Xanthomonas campestris* e.g. NRRL B-1459, as described, for example, in U.S. Pat. No. 4,299,825, or *Xanthomonas campestris* NCIB 11854, as described in EP-A-No. 130 647.

Preferably the polysaccharide used in the process of the invention is a xanthan biopolymer or a succinoglycan biopolymer.

Aqueous solutions of polysaccharides having polysaccharide concentrations in the range below 2% w/w to 18% w/w have been obtained by ultrafiltration of dilute aqueous solutions of polysaccharides by ultrafiltration, e.g. as described in EP-A-No. 49012. Preferably the aqueous solution of polysaccharide used in step (a) of the process of the invention contains 7 to 10% w/w polysaccharide.

It is further preferred for the emulsion of step (a) to contain 3 to 5% w/w polysaccharide.

Suitable oils for use in the process of the invention include the volatile oils described in EP-A-No. 128 661 and the hydrophobic liquids described in EP-A-No. 137 538. The oil preferably comprises a hydrocarbon solvent, advantageously a non-aromatic hydrocarbon solvent, distilling within the temperature range 150° to 250° C., more preferably 160° to 200° C. Aliphatic hydrocarbon solvents distilling within the temperature range 170° to 190° C. have been found to be very effective.

The at least one dispersion promoter may be selected from surfactants (emulsifiers) and stabilisers. Suitable such dispersion promoters are described in EP-A-No. 128 661 and EP-A-No. 137 538. Preferably the at least one dispersion promoter comprises at least one non-ionic emulsifier. Examples of such emulsifiers include sorbitan esters, e.g. sorbitan monooleate, sorbitan monolaurate; ethoxylates of fatty alcohols, e.g. ethoxylates of $C_{9-11}$ alkanols containing 5 ethoxy units; ethoxylated sorbitan or sorbitol esters e.g. ethoxylated sorbitan monooleate containing about 5 ethoxy groups; alkyl phenol ethoxylates such as nonylphenol ethoxylates; and compounds such as poly-isobutylene-maleic-anhydride-triethylene tetramine.

Step (b) of the process of the invention is preferably effected at a temperature in the range 40° to 60° C. and at a pressure in the range $4 \times 10^3$ to $2 \times 10^3$ Pa, advantageously at a temperature in the range 40° to 50° C. and a pressure in the range $4 \times 10^3$ to $2.5 \times 10^3$ Pa.

An advantage of the process of the invention is that it provides access to previously unobtained polysaccharide in oil dispersions containing 40 to 50% w/w polysaccharide and 3 to 4.5% w/w of at least one dispersion promoter, which are useful compositions for dispersing into aqueous solutions for use in enhanced oil recovery operations or in well-drilling operations, e.g. in oil or gas wells, as completion fluids, work-over fluids or drilling fluids. Accordingly the invention also includes such dispersions obtainable by the process of the invention.

The invention will be further understood from the following illustrative examples, in which various abbreviations and trade marks have the following meanings:

"SHELLFLO-XA 140" (trade mark) biopolmer concentrate is an aqueous xanthan biopolymer concentrate containing 8.1% w/w (dry polymer) xanthan biopolymer (ex. Shell Chemicals UK Ltd.), "SPAN 20" (trade mark) emulsifier (ex. Atlas Chemie GmbH, W. Germany) is sorbitan monolaurate, "DOBANOL 91-6" (trade mark) emulsifier (ex Shell Chemicals UK Ltd.), is an ethoxylate of $C_{9-11}$ alkanols containing 6 ethoxy units and having HLB (hydrophile-lipophile balance) 12.5, "SAP 230" ("SAP" is "SHELL" (trade mark) Additives Package) emulsifier is poly-isobutylene-maleic-anhydride-triethylene tetramine, wherein the polyisobutylene portion has Mn 1000 and the mol. ratio poly-isobutylene:maleic anhydride:triethylene tetramine is 1:1:0.7, and "SHELLSOL TD" (trade mark) solvent is a blend of isoparaffins of distillation range 170° to 190° C. (ASTM D.1078).

EXAMPLE 1

An emulsion was prepared from the following components:

|  | Weight (g) |
|---|---|
| "SHELLFLO-XA 140" biopolymer concentrate | 83 |
| "SPAN 20" emulsifier | 1.2 |
| "DOBANOL 91-6" emulsifier | 0.3 |
| "SAP 230" emulsifier | 0.15 |
| "SHELLSOL TD" solvent | 98.35 |

The emulsifiers were dissolved in the solvent and the resulting solutin and the biopolymer concentrate were mixed together for 5 minutes at 40° to 50° C. with an "Ultra Turrax T45/4G" (trade mark) mixer (ex Janke and Kunkel) at 10,000 r.p.m.

The resulting stable water-in-oil emulsion contained 3.7% w/w biopolymer (dry polymer) and 0.9% w/w additives (emulsifiers).

This emulsion was placed in a rotating evaporator and water and solvent were evaporated azeotropically at a temperature rising from 40° C. and pressure reducing from $4 \times 10^3$ Pa (30 mmHg).

When the temperature had increased to 50° C. and the pressure had decreased to $2.67 \times 10^3$ Pa (20 mmHg), evaporation was stopped and the residue was allowed to stand at ambient temperature (20° C.) for 24 hours.

The residue separated into two layers, the upper layer (about 80% v/v) of which contained very little biopolymer, the bulk of which was present in the lower layer (about 20% v/v). The two layers were separated by decantation.

Vicosifying power of samples of the emulsion, the residue, the upper layer and the lower layer was measured by diluting quantities of the respective samples in low-salinity brine (water containing 1% w/w sodium chloride and 0.1% calcium chloride) (with mixing using an "Ultra Turrax T 45/2G" (trade mark) mixer at 5,000 r.p.m.) in amounts such that the resulting aqueous solutions had viscosities of 20 cP ($20 \times 10^{-3}$ Pa.s) at 30° C. and shear rate of $7.3s^{-1}$, measured on a Brookfield "Rotoviscometer" (trade mark), Model LVT with UL adaptor at 6 r.p.m. Viscosifying power is expressed as $DF_{20}$ (DF=dilution factor) which represents that weight of brine (g) per unit weight of sample (g) which gave the viscosity of 20 cP under the above conditions.

Results, with concentrations of biopolymer and additives are given in Table I following. Determination of additives concentrations between the upper and lower layers was by infra-red absorption measurement.

TABLE I

| Sample | biopolymer (% w/w) | additives (% w/w) | $DF_{20}$ (g/g) |
| --- | --- | --- | --- |
| Emulsion | 3.7 | 0.9 | 72 |
| Residue | 13.9 | 3.4 | 270 |
| Upper layer | 7.0 | 3.4 | 137 |
| Lower layer | 41.0 | 3.4 | 802 |

It can thus be seen that the lower layer is a useful, high-concentration biopolymer-in-oil dispersion, which was stable on storage for at least 3 months at 20° C. The upper layer contains a low percentage of biopolymer together with about 80% of the original quantity of additives in the water-in-oil emulsion and can thus be recycled for the preparation of further water-in-oil emulsion.

EXAMPLE 2

An emulsion was prepared as in Example 1, and was evaporated as in Example 1.

After evaporation was stopped, the residue was allowed to cool to ambient temperature (20° C.), and was then subjectd to centrifugation in a MSE "Super Minor" table centrifuge for 20 minutes at 3000 r.p.m. The residue separated into upper (about 80% v/v) and lower (about 20% v/v) layers and the upper layer was decanted off. The lower layer was initially in the form of a solid sediment, which was surprisingly easily liquefied by stirring with a spatula to give a low-viscosity liquid dispersion. This dispersion was stable on storage for at least 3 months at ambient temperature (20° C.), with no re-formation of sediment.

Viscosifying power measurement was as for Example 1, results being given in Table II following.

TABLE II

| Sample | biopolymer (% w/w) | additives (% w/w) | $DF_{20}$ (g/g) |
| --- | --- | --- | --- |
| Emulsion | 3.7 | 0.9 | 72 |
| Residue | 13.8 | 3.4 | 270 |
| Upper layer | 1.1 | 3.4 | 21 |
| Lower layer | 47.5 | 3.4 | 924 |

It can be seen that the lower layer contains a higher concentration of biopolymer than was obtained in Example 1 and the upper layer, which could be recycled for the preparation of further water-in-oil emulsion, contained a lower concentration of biopolymer than in Example 1.

EXAMPLE 3

An emulsion was prepared as in Example 1, and was evaporated as in Example 1.

After evaporation was stopped, the residue was allowed to cool to 30° C. and was then subjected to microfiltration. The microfiltration module employed was a cross-flow module provided with a polysulfone microfiltration membrane of pore diameter 0.1 micrometre (DDS membrane, type "GRM 0.1"). Before use the membrane was dewatered with ethanol. Microfiltration was effected at 30° C. with a pressure differential of 4 bar ($10^5$ Pa).

The permeate was found to contain no biopolymer, and it consisted of solvent and additives. The retentate was a biopolymer-in-oil dispersion containing all of the biopolymer from the residue.

Viscosifying power measurement was as for Example 1, results being given in Table III following.

TABLE III

| Sample | biopolymer (% w/w) | additives (% w/w) | $DF_{20}$ (g/g) |
| --- | --- | --- | --- |
| Emulsion | 3.7 | 0.9 | 72 |
| Residue | 15.1 | 3.7 | 293 |
| Permeate | 0.0 | 3.7 | 0 |
| Retentate | 42.3 | 3.7 | 821 |

The retentate was stable on storage for at least 3 months at 20° C. The permeate is suitable for recycling for the preparation of urther water-in-oil emulsion.

COMPARATIVE EXAMPLE A

An emulsion was prepared as in Example 1 (containing 3.7% w/w biopolymer and 0.9% w/w additives).

This emulsion was placed in a rotating evaporator and was concentrated in accordance with the general procedure described in the Examples of EP-A-No. 128661. Thus water and solvent were evaporated azeotropically at a temperature rising from 40° C. and pressure reducing from $4 \times 10^3$ Pa (30 mmHg), and at cessation of azeotropic evaporation (temperature about 50° C. and pressure about $2.67 \times 10^3$ Pa (20 mmHg)) the temperature was progressively raised to 90° C. and the pressure reduced to $5.3 \times 10^2$ PA (4 mmHg) to evaporate the solvent. When the volume of the resdue was about 10% of the original volume of the emulsion evaporation was stopped and the residue was allowed to cool to ambient temperature (20° C).

Viscosifying power measurement was as for Example 1, results being given in Table IV following.

TABLE IV

| Sample | biopolymer (% w/w) | additives (% w/w) | $DF_{20}$ (g/g) |
| --- | --- | --- | --- |
| Emulsion | 3.7 | 0.9 | 72 |
| Residue | 45.0 | 10.9 | 810 |

Although the residue was a stable, high-concentration biopolymer-in-oil dispersion, it should be noted that it contains all the additives which were present in the original emulsion. There is thus no possibility of recycling excess additives, which were necessary for the formation of the original emulsion, but are not necessary to enable dispersion of the residue in large volumes of water. Another disadvantage is the high energy requirement of heating at 90° C. for distillation of the solvent (in raising the concentraton of biopolymer in the residue up to 45% w/w, from the range 13.8 to 15.1% w/w (c.f. Examples 1 to 3) solvent comprising over 65% w/w of that residue has to be distilled off).

A further disadvantage of Comparative Example A is that exposure to temperatures as high as 90° C. results in a loss of viscosifying power. This is evidenced on a qualitative basis by the fact that the retentate of Example 3 had a lower concentration of biopolymer but a higher $DF_{20}$ value. A quantitative measure can be obtained by dividing the $DF_{20}$ value by the concentration of biopolymer (thus gaining a notional dilution factor per 1% biopolymer in the final product). Values thus obtained for Examples 1 to 3 and Comparative Example A are given in Table V following.

TABLE V

| Dispersion of Example | biopolymer % w/w | $DF_{20}$ (g/g) | $DF_{20}$/biopolymer |
| --- | --- | --- | --- |
| 1 | 41.0 | 802 | 19.56 |
| 2 | 47.5 | 924 | 19.45 |
| 3 | 42.3 | 821 | 19.41 |
| Comp. A | 45 | 810 | 18.00 |

The $DF_{20}$/biopolymer value for Comparative Example A is clearly significantly lower than for Examples 1 to 3, indicating a significant loss of viscosifying power of the biopolymer, presumably due to the exposure to high temperatures.

EXAMPLE 4

An emulsion was prepared from the following components, following the procedure of Example 1:

|  | Weight (g) |
| --- | --- |
| "SHELLFLO-XA 140" biopolymer concentrate | 83 |
| "SPAN 20" emulsifier | 1.6 |
| "DOBANOL 91-6" emulsifier | 0.4 |
| "SAP 230" emulsifier | 0.2 |
| "SHELLSOL TD" solvent | 97.8 |

The resulting stable water-in-oil emulsion contained 3.7% w biopolymer and 1.2% w/w additives. The emulsion was evaporated, and the residue was allowed to stand and was separated by decantation, as in Example 1. Substantially identical results were obtained as in Table I, except that the additives concentration in the residue and in the upper and lower layers was 4.3% w/w.

We claim:

1. A process for the preparation of a polysaccharide in oil dispersion which comprises the steps of
    (a) forming a water-in-oil emulsion by dispersing in oil an aqueous solution of polysaccharide, in the presence of at least one dispersion promoter,
    (b) drying the resulting emulsion azeotropically, and
    (c) physically isolating from the resulting azeotropically dried residue an oil phase containing oil and dispersion promotor and a polysaccharide in oil dispersion in the form of a suspension phase containing polysaccharide, dispersion promoter and oil.

2. A process according to claim 1 wherein the emulsion of step (a) contains 3 to 5% w/w polysaccharide.

3. A process according to claim 1 or 2 wherein the aqueous solution of polysaccharide contains 7 to 10% w/w polysaccharide.

4. A process according to any of claims 1 or 2 wherein the at least one dispersion promoter comprises at least one non-ionic emulsifier.

5. A process according to any of claims 1 or 2 wherein the oil comprises a hydrocarbon solvent distilling within the temperature range 150° C. to 250° C.

6. A process according to claim 5 wherein the temperature range is 160° to 200° C.

7. A process according to any of claims 1 or 2 wherein step (b) is effected at a temperature in the range 40° to 60° C. and at a pressure in the range $4 \times 10^3$ to $2 \times 10^3$ Pa.

8. A process according to claim 7 wherein the temperature is in the range 40 to 50° C. and the pressure is in the range $4 \times 10^3$ to $2.5 \times 10^3$ Pa.

9. A process according to claim 8 wherein the polysaccharide is a xanthan biopolymer or a succinoglycan biopolymer.

* * * * *